(12) United States Patent
Manickam et al.

(10) Patent No.: US 10,277,466 B2
(45) Date of Patent: Apr. 30, 2019

(54) NETWORK AWARE DYNAMIC ORCHESTRATION METHOD AND SYSTEM FOR MULTICAST SERVICES

(71) Applicant: Cisco Technology, Inc., San Jose, CA (US)

(72) Inventors: Arul Murugan Manickam, San Jose, CA (US); Ramesh Kumar Chinnasamy, Milpitas, CA (US); Aditi Srivastava, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 173 days.

(21) Appl. No.: 15/348,078

(22) Filed: Nov. 10, 2016

(65) Prior Publication Data

US 2018/0131568 A1 May 10, 2018

(51) Int. Cl.
*H04L 12/24* (2006.01)
*H04L 12/733* (2013.01)
(Continued)

(52) U.S. Cl.
CPC ........ *H04L 41/0893* (2013.01); *G06F 9/4856* (2013.01); *G06F 9/5077* (2013.01);
(Continued)

(58) Field of Classification Search
None
See application file for complete search history.

(56) References Cited

U.S. PATENT DOCUMENTS

| 8,966,495 B2 | 2/2015 | Kulkarni | |
| 2008/0155537 A1* | 6/2008 | Dinda | G06F 9/4887 718/1 |

(Continued)

OTHER PUBLICATIONS

Meng, X. et al. "Improving the Scalability of Data Center Networks with Traffic-aware Virtual Machine Placement", Infocom, 2010 Proceedings IEEE, IEEE, Piscataway, NJ, USA, Mar. 14, 2010, pp. 1-9.

(Continued)

*Primary Examiner* — Natisha D Cox
(74) *Attorney, Agent, or Firm* — Meunier Carlin & Curfman LLC

(57) ABSTRACT

Presented herein is an exemplified system and method that facilitate network-aware consolidation, by orchestration, of similar sets of virtualized multicast-traffic receivers and/or sources (e.g., Virtual Machines) under a common network fabric element (e.g., same leaf switch and/or spine switch in a data center network fabric), e.g., to reduce network switch work load and/or number of network fabric elements involved with transmission of multicast traffic. The orchestration of scattered- and like-sets of multicast-traffic receivers and/or sources under a common network fabric element (e.g., a single and same leaf switch and/or spine switch) facilitates improvements of the operation of orchestration management technologies and virtualization overlay technologies by, e.g., improving network efficiency for multicast packet switching, reducing control plane traffic (e.g., IGMP queries), and reducing delay- and packet-transfer errors.

20 Claims, 10 Drawing Sheets

(51) Int. Cl.
*H04L 12/931* (2013.01)
*G06F 9/48* (2006.01)
*G06F 9/50* (2006.01)

(52) U.S. Cl.
CPC ............ *H04L 45/20* (2013.01); *H04L 49/201* (2013.01); *H04L 41/24* (2013.01)

(56) References Cited

U.S. PATENT DOCUMENTS

| | | | |
|---|---|---|---|
| 2011/0225277 A1* | 9/2011 | Freimuth | G06F 9/45558 709/223 |
| 2013/0132607 A1* | 5/2013 | Sinha | H04L 45/00 709/238 |
| 2014/0219086 A1* | 8/2014 | Cantu' | H04L 47/18 370/231 |
| 2014/0369345 A1* | 12/2014 | Yang | H04L 12/18 370/355 |
| 2017/0279690 A1* | 9/2017 | Tripathi | H04L 47/783 |

OTHER PUBLICATIONS

Extended European Search Report dated Apr. 5, 2018, from Application No. EP17183115.9, 9 pages.

* cited by examiner

NETWORK AWARE DYNAMIC ORCHESTRATION METHOD AND SYSTEM FOR MULTICAST SERVICES

TECHNICAL FIELD

The present disclosure relates to management of virtual machines in networks, in particular, network routing of multicast traffic of orchestrated network resources.

BACKGROUND

In data centers, applications are run on, and routed through, physical- and virtual-computing and network resource such as on virtual machines and virtual routers and switches. Cloud/data-center management systems employ many different technologies to provide Fabric management, workload-automation, virtual fabric, platform management, which can directly or indirectly cause the provisioning of computing and network resources in a network fabric or to modify such provisioned resources.

Cloud management operations can cause unintended consequences to the network fabric (e.g., unduly increasing the network traffic) when provisioning computing or network resources without accounting for placement of such provisioned resources.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8, comprising

FIG. 9, comprising

DESCRIPTION OF EXAMPLE EMBODIMENTS

Overview

Figure 1:
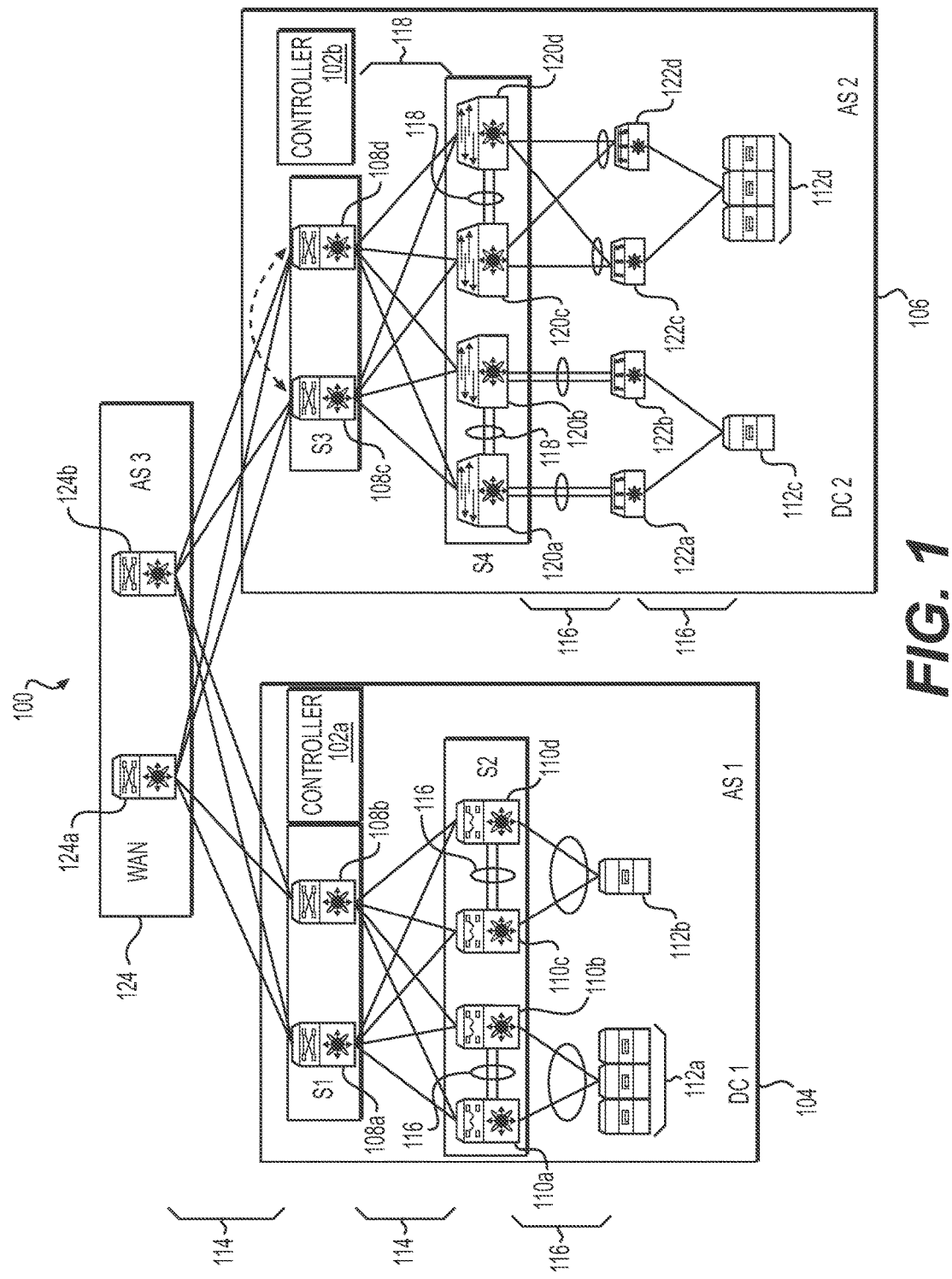
FIG. 1 is a diagram illustrating an example network that includes a controller configured to consolidate similar sets of virtualized multicast-traffic receivers and/or sources under a same leaf switch in a network fabric, in accordance with an embodiment.

Presented herein is an exemplified system and method that facilitate network-aware consolidation, by orchestration, of similar sets of virtualized multicast-traffic receivers and/or sources (e.g., Virtual Machines) under a common network fabric element (e.g., same leaf switch and/or spine switch in a data center network fabric), e.g., to reduce network switch work load and/or number of network fabric elements involved with transmission of multicast traffic. The orchestration of scattered- and like-sets of multicast-traffic receivers and/or sources under a common network fabric element (e.g., a single and same leaf switch and/or spine switch) facilitates improvements of the operation of orchestration management technologies (e.g., DFA) and virtualization overlay technologies (e.g., EVPN) by, e.g., improving network efficiency for multicast packet switching, reducing control plane traffic (e.g., IGMP queries), and reducing delay- and packet-transfer errors.

Exemplified systems and methods can be used with cloud and system management products to manage network fabrics by enforcing fabric policies, optimizing fabric infrastructure, and automating the provisioning of network resources across physical and virtual environments that consolidate scattered multicast resources. In some embodiments, exemplified systems and methods can be used, for example, but not limited to, to orchestrate and to manage virtual machines in data centers, including Massively Scalable Data Center (MSDC).

Network aware refers to the intelligent monitoring of applications, network traffic, network configuration, among other things, within a given network to improve network performance (e.g., more throughput, less latency or delay, less errors or failures in transmission, etc.) and efficiency (e.g., less number of hops for a given packet flow, energy use per packet or flow delivery, etc.).

Similar or like sets of virtualized multicast-traffic receivers include computing devices having membership in a multicast group. Similar or like sets of virtualized multicast-traffic sources include corresponding hosts and computing devices that originates multicast traffic sent to multicast-traffic-receiver groups (e.g., a host or device that originates the multicast traffic packet).

In an aspect, a system is disclosed (e.g., a switch, OpenStack controller, or a standalone controller in a data center). The system includes a processor; and a memory having instructions stored thereon, wherein execution of the instructions, cause the processor to: interrogate at least one network node of a plurality of network nodes (e.g., leaf nodes) each corresponding to a leaf node in a network to identify (e.g., by retrieving JOIN information of a IGMP/PIM/MPBGP multicast distribution tree) a plurality of virtualized computing devices that receives a multicast packet traffic from the at least one network node; identify two or more virtualized computing devices of the plurality of virtualized computing devices associated with a given multicast packet to migrate under a common leaf node (e.g., wherein the two or more virtualized computing devices include a first virtualized computing device and a second virtualized computing device, and wherein the first virtualized computing device receives the given multicast packet from a first leaf node and the second virtualized computing device receives the given multicast packet from a second leaf node); and cause i) orchestration of the first virtualized computing device at the second leaf node or ii) orchestration of the second virtualized computing device at the first leaf node (e.g., so as to consolidate scattered receivers under a common leaf node).

In some embodiments, the instructions that cause the orchestration of the first virtualized computing device at the second leaf node include one or more instructions that when executed by the processor cause the processor to: transmit a first command (e.g., to ESX or an orchestration controller) to instantiate the first virtualized computing device at the second leaf node; and transmit a second command (e.g., to ESX or the orchestration controller) to remove (e.g., de-instantiate) the first virtualized computing device at the first leaf node.

In some embodiments, the instructions that cause the orchestration of the second virtualized computing device at the first leaf node includes one or more instructions that when executed by the processor cause the processor to: transmit a first command (e.g., to ESX, OpenStack, or other orchestration controller) to instantiate the second virtualized computing device at the first leaf node; and transmit a second command (e.g., to ESX, OpenStack, or the other orchestration controller) to remove (e.g., de-instantiate) the second virtualized computing device at the second leaf node.

In some embodiments, the instructions, when executed by the processor, cause the processor to: interrogate control plane (e.g., IGMP, PIM, MPBGP control plane) of a plurality of multicast packets to determine distribution data (e.g., distribution table) of multicast sources and multicast receivers of the plurality of multicast packets, wherein i) orchestration of the first virtualized computing device at the second leaf node or ii) orchestration of the second virtualized computing device at the first leaf node is performed based on the determined distribution data (e.g., distribution table).

In some embodiments, the system is implemented in a standalone controller (e.g., a Linux-based controller, an OpenStack controller, an ESX controller, etc.) in the network.

In some embodiments, the system is implemented in a switch (e.g., a Leaf node).

In some embodiments, execution of the instructions, cause the processor to: in response to identifying a second two or more virtualized computing devices of the plurality of virtualized computing devices being associated with a second multicast packet (e.g., wherein the second multicast packet is sourced from a computing device external to the network and wherein the second multicast packet enters the network at a border router or switch), cause orchestration of the second two or more virtualized computing devices at the border router or a network node (e.g., a common network node) proximal to the border router (e.g., so as to consolidate scattered receivers under a common leaf node that is near, or located at, the border router).

In some embodiments, execution of the instructions, cause the processor to: retrieve a network identifier (e.g., IP address) associated with each of the or more virtualized computing devices; and determine a corresponding name (e.g., virtual machine name) of each given virtualized computing device, wherein the name of each given virtualized computing device is used to instantiate the given virtualized computing device at a new leaf node.

In some embodiments, execution of the instructions, cause the processor to: determine, for a given multicast packet, a number of hops between a source and each receiver of a plurality of receivers of the given multicast packet; and determine a leaf node that has a minimum number of aggregated hops between the source and each receiver if the receivers are relocated to the leaf node.

In some embodiments, the instructions are editable as policies executing on the system. In some embodiments, a selectable policy includes a consolidation of virtualized receivers of multicast traffic under one or more common leaf(s) with the source of the multicast traffic. In some embodiments, a selectable policy includes a consolidation of virtualized receivers and corresponding sources of multicast traffic under a common leaf with a least number of migrations. In some embodiments, a selectable policy includes a consolidation of virtualized receivers of multicast traffic at one or more network nodes that have a direct connection with a border leaf (e.g., when the multicast traffic source is located outside the WAN). In some embodiments, a selectable policy includes a consolidation of virtualized receivers of multicast traffic at one or more network nodes that allows for a certain user-defined load at that network node or at nearby nodes.

In another aspect, a system (e.g., a switch or a standalone controller in a data center) is disclosed. The system includes a processor; and a memory having instructions stored thereon, wherein execution of the instructions, cause the processor to: interrogate at least one network nodes of a plurality of network nodes (e.g., leaf nodes) each corresponding to a leaf node in a network to identify a plurality of virtualized computing devices that receives the multicast packet traffic from the at least one network node; identify i) a first virtualized computing device of the plurality of virtualized computing devices as a source of the given multicast packet and i) two or more virtualized computing devices of the plurality of virtualized computing devices as a receiver of the given multicast packet, wherein the first virtualized computing device transmits the given multicast packet to a first leaf node and the second virtualized computing device receives the given multicast packet from a second leaf node; and cause orchestration of the first virtualized computing device at the second leaf node (e.g., so as to consolidate the source with the receivers under a common leaf node).

In some embodiments, the instructions that cause the orchestration of the first virtualized computing device at the second leaf node comprise: one or more instructions that when executed by the processor cause the processor to i) transmit a first command (e.g., to ESX or an orchestration controller) to instantiate the first virtualized computing device at the second leaf node and ii) transmit a second command (e.g., to ESX or the orchestration controller) to remove (e.g., de-instantiate) the first virtualized computing device at the first leaf node.

In some embodiments, the instructions that cause the orchestration of the second virtualized computing device at the first leaf node comprises: one or more instructions that when executed by the processor cause the processor to i)

transmit a first command (e.g., to ESX, OpenStack, or other orchestration controller) to instantiate the second virtualized computing device at the first leaf node and ii) transmit a second command (e.g., to ESX, OpenStack, or the other orchestration controller) to remove (e.g., de-instantiate) the second virtualized computing device at the second leaf node.

In some embodiments, the instructions, when executed by the processor, cause the processor to: interrogate control plane (e.g., IGMP, PIM, MPBGP control plane) of a plurality of multicast packets to determine a distribution of multicast sources and multicast receivers of the plurality of multicast packets, wherein i) orchestration of the first virtualized computing device at the second leaf node or ii) orchestration of the second virtualized computing device at the first leaf node is performed based on the determined distribution.

In some embodiments, execution of the instructions, cause the processor to: in response to identifying a second two or more virtualized computing devices of the plurality of virtualized computing devices being associated with a second multicast packet, wherein the second multicast packet is sourced from a computing device external to the network and wherein the second multicast packet enters the network at a border router or switch, cause orchestration of the second two or more virtualized computing devices at the border router or a network node (e.g., a common network node) proximal to the border router (e.g., so as to consolidate scattered receivers under a common leaf node that is near, or located at, the border router).

In some embodiments, execution of the instructions, cause the processor to i) retrieve a network identifier (e.g., IP address) associated with each of the or more virtualized computing devices and ii) determine a corresponding name (e.g., virtual machine name) of each given virtualized computing device, wherein the name of each given virtualized computing device is used to instantiate the given virtualized computing device at a new leaf node.

In some embodiments, execution of the instructions, cause the processor to: determine, for a given multicast packet, a number of hops between a source and each receiver of a plurality of receivers of the given multicast packet; and determine a leaf node that has a minimum number of aggregated hops between the source and each receiver if the receivers are relocated to the leaf node.

In some embodiments, the instructions are editable as policies executing on the system.

In another aspect a method is disclosed (e.g., of consolidating or migrating virtual machines that receive multicast packet traffic). The method includes determining, by a processor, for a multicast group, a source virtual machine of the multicast group and a plurality of receiver virtual machines of the multicast group; and, in response to determining one or more of the plurality of receiver virtual machines of the multicast group being attached to a first number of different leaf nodes, including a first leaf node and a second leaf node, cause, by the processor, consolidation of the plurality of receiver virtual machines by instantiate one or more of the receiver virtual machines at one or more common leaf nodes, wherein the one or more common leaf nodes has a second number of different leaf nodes that is less than the first number.

In some embodiments, the consolidation reduces a number of forwarding actions for a given multicast traffic to be multicast replicated to the multicast group.

Example Network

FIG. 1 is a diagram illustrating an example network 100 that includes a controller 102 (shown as controllers 102a and 102b) configured to consolidate similar sets of virtualized multicast-traffic receivers and/or sources under a same leaf switch and/or spine switch in a network fabric, in accordance with an embodiment. The network 100 may be implemented, for example, in a data center or across multiple data centers and/or over several wide-area networks.

The controller 102 communicates with one or more nodes in the network 100 to determine similar sets of virtualized multicast-traffic receivers and/or source. In some embodiments, the controller 102 is configured to directly interrogate local multicast routers and switches for multicast group membership information (e.g., IGMP group membership information).

In some embodiments, the controller 102 serves as a switch or router with IGMP snooping features configured to observe IGMP transactions. In other embodiments, the controller is implemented, e.g., as a module, within a cloud management or orchestration management system, e.g., a Linux controller, an OpenStack controller, an ESX controller, and similar controllers. In some embodiments, the system is implemented in a switch (e.g., a Leaf node). In yet other embodiments, the controller is implemented as a network analyzer configured to determine multicast traffic flow with a network. In any of the above embodiments, the controller can communicates with controller agents (e.g., virtual agents) that are configured to run on other network nodes to provide network control information (e.g., multicast traffic) to the controller 102.

The network 100, as shown in this illustrative non-limiting example, includes a first data center (shown as "DC1 104") and a second data center (shown as "DC2" 106) connected via a common WAN layer 124 comprising WAN-layer switches 124a and 124b. The WAN-layer switches 124a, 124b are running, in this example, Layer-3 type links 114, for example, Intermediate System-to-Intermediate System (IS-IS) protocol and Border Gateway Protocol (BGP), with Layer-3 (L3) switches 108 (also referred to as "spine-layer switches" 108a, 108b, 108c, and 108d) at data center "DC1" 102. The spine-layer switches 108a, 108b are running, in this example, OSPF (Open Shortest Path First) protocol within the data center "DC1" 102 and running IS-IS (Intermediate System-to-Intermediate System) and BGP (Border Gateway Protocol) to the WAN 124. The leaf-layer switches (shown as 110a, 110b, 110c, and 110d) (also referred to as "vPC switches" 110a-d) are configured as vPC (Virtual PortChannel) pairs to servers (shown as 112a, 112b). The vPC switch pairs (110a, 110b and 110c, 110d) communicate with each other and with network devices 112 (shown as 112a and 112b) via Layer-2 links 116. The network devices 112 may be receivers and/or sources of multicast traffic.

Examples of network devices 112 include servers, hosts, LAN switches, storage area network (SAN) systems, security systems, switches/routers, telephony devices, virtual servers, virtual hosts, virtual LAN switches, virtual storage area network (SAN) systems, virtual security systems, virtual switches/routers, virtual telephony devices, and other dedicated or virtual devices configured to generate or replicate multicast traffic and/or receive multicast traffic.

Referring to FIG. 1, the first data center (shown as "DC1 104") is connected to a second data center (shown as "DC2" 106) via a common WAN layer 124 comprising WAN-layer switches 124a and 124b. To this end, when the source of a multicast-traffic is determined to originate from another data center (e.g., "DC2" 106), the controller 102 may direct migration of multicast-traffic receivers 202 to computing devices and resources connected to a border router or to a network node that is proximally closest, in terms of number of hops or forwarding, to the border router.

As shown in FIG. 1, data center "DC2" 104 uses a FabricPath network 118 in which the spine-layer switches (shown as 108c and 108d) are HSRP peers (i.e., "Hot Anycast Hot Standby Router Protocol" peers). As shown, the spine switches 108c and 108d host virtual interfaces (SVIs) to each other and also participates in BGP routing with the WAN layer 124. A pair of Layer-2 leaf switches (shown as 120a and 120b) is configured as a vPC+ pair with dual-homed fabric extenders (FEXs) (shown as 122a and 122b) with vPC+ connected to them. The server 112c uses a Link Aggregation Control Protocol (LACP) Enhanced vPC+ (evPC+) connection to the two dual-homed fabric extenders 122a, 112b. The other pair of Layer-2 leaf switches (shown as 120c and 120d) is configured as a vPC+ pair but with single-homed fabric extenders (shown as 122c and 122d) connected to them. The server 112d uses an LACP vPC+ connection to the two single-homed fabric extenders 122c, 122d.

Figure 2:
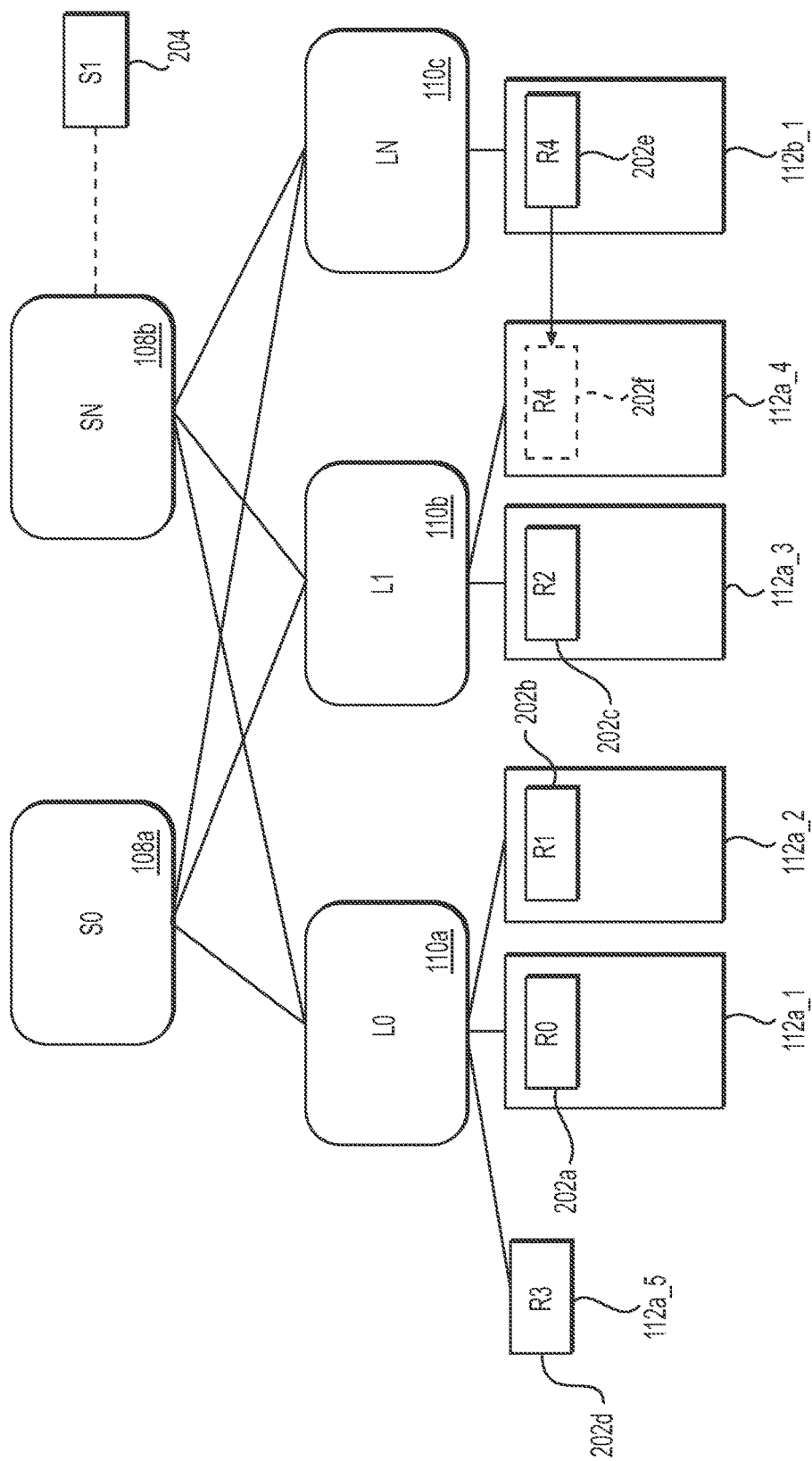
FIG. 2 is a diagram illustrating an example network-aware consolidation, by orchestration, of similar sets of virtualized multicast-traffic receivers under a common network fabric element, in accordance with an illustrative embodiment.

FIG. 2 is a diagram illustrating an example network-aware consolidation, by orchestration, of similar sets of virtualized multicast-traffic receivers (e.g., network device 112) under a common network fabric element, in accordance with an illustrative embodiment. As shown, virtual machines or virtual devices are re-arranged to increase switch performance for multicast data services.

As shown in FIG. 2, multicast-traffic receivers 202 (shown as "r0" 202a, "r1" 202b, "r2" 202c, "r3" 202d, "r4" 202e) of a given multicast-traffic source 204 (shown as "s1" 204) are provisioned, or are located, across several leaf switches 110 (shown as "L0" 110a, "L1" 110b, and "LN" 110c). The multicast-traffic receivers 202 include virtual devices (e.g., 202a, 202b, 202c, 202d, 202e) provisioned on network devices 112 (e.g., 112a_1, 112a_2, 112a_3, and 112a_4) as well as network device 112a_5 (e.g., also shown as "r5" 202f).

In this example, multicast-traffic receiver "r4" 202e is provisioned on network device 112b_1, which is operatively coupled to leaf switch "LN" 110c, while other multicast-traffic receivers (e.g., 202a, 202b, 202c, and 202d) of a given multicast-traffic source 204 are operatively coupled to leaf switch "L0" 110a and "L1" 110b. When a multicast packet is transmitted from multicast-traffic source "s1" 204 to multicast-traffic receivers 202 (e.g., 202a-202i), three packet replications may result, e.g., at spine-switch "SN" 108b to leaf-switch "L0" 110a, at leaf-switch "L1" 110b, and at leaf-switch "L2" 110c along with five corresponding replications at the leaf-switches 110a, 110b, 110c to the multi-cast-traffic receivers 202a, 202b, 202c, 202d, and 202e. By migrating, for example, multicast-traffic receiver "r4" 202e (provisioned at a device network 112b_1 located at leaf-switch "LN" 110c) to another leaf-switch that includes another multicast-traffic receiver of the same multicast traffic (here, "r4" 202e shown to migrate to leaf-switch "L1" 110b), the same (or subsequent) multicast packet transmitted from multicast-traffic source "s1" 204 to multicast-traffic receivers 202 (e.g., 202a-202i) may result in one less packet replications (which is about 13 percent increase in transmission efficiency in this example). That is, by migrating multicast-traffic receiver "r4" 202e from network device 112b_1 to network device 112a_4, the spine-switch "SN" 108b now performs two packet replications (rather than 3 packet replications) to leaf-switches "L0" 110a and "L1" 110b, which then performs five corresponding replications to the multicast-traffic receivers (e.g., 202a-202d and 202f).

Further consolidation of multicast-traffic receivers 202 (e.g., 202a-202d and 202f) to a common leaf-switch or to a common spine switch would further improve transmission efficiency. For example, by consolidating all five receivers (e.g., 202a-202d and 202f) under a single common leaf-switch (e.g., 110a) (e.g., by migrating "r2" 202c and "r4" 202e to network device 112a_1 and/or 112a_2), the number of replications, in this example, is reduced to six (6) (a 25% percent increase in transmission efficiency from eight (8) replications in the first example prior to consolidation).

Multicast packet switching (both routing and switching) to N devices is more efficient than unicast switching of same message to the N devices in a given network, but such benefits can be diminished when the multicast source and multicast receivers are scattered across the network (e.g., across the Layer 2 and Layer 3 part of the network) as shown in the examples of FIG. 2. In a worst case scenario, a multicast packet to N devices can result in 1-to-N level of packet switching if each multicast-traffic receiver device is located at a different terminating node of the Layer-2 and Layer-3 network.

In data center, specifically Massively Scaled Data Center (MSDC), virtual machines (VM) mobility (virtualization function to migrate a virtual machine from one physical host to another) is common, e.g., to use data center hardware and software efficiently. Data Center technologies that automate fabric control and eVPN (Ethernet VPN) facilitates VM to spread across leafs and supports VM mobility. Because VM mobility may be a common operation in certain data center, the likelihood multicast source and receiver being scattered is high, particularly when VM mobility policies are set by administrators of the data center. Scattered multicast receivers (as discussed in relation to FIG. 2), as well as scattered multicast receivers and sources (as discussed in relation to FIG. 3) can lead to more network load in a given network.

Figure 3:
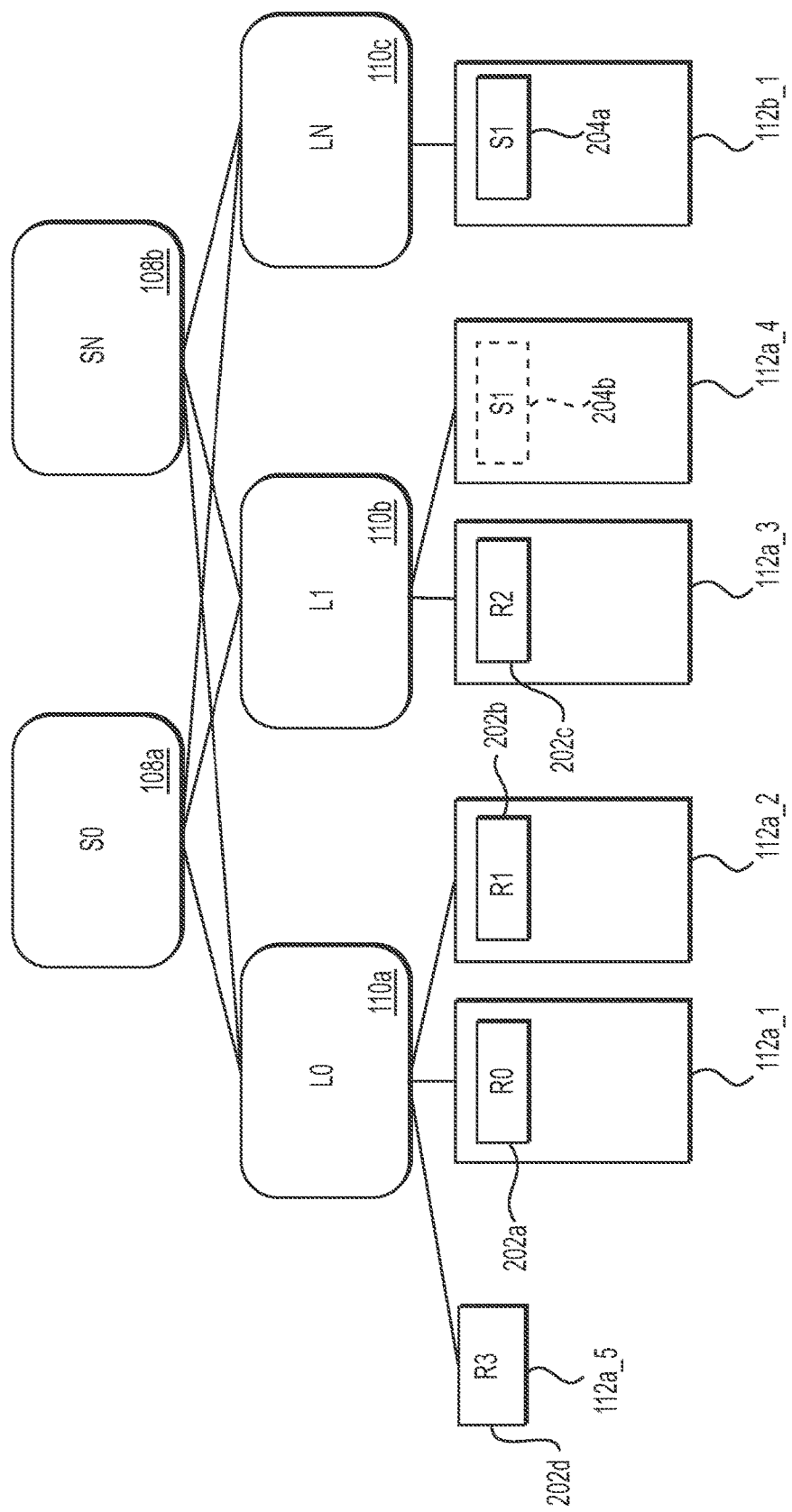
FIG. 3 is a diagram illustrating an example network-aware consolidation, by orchestration, of multicast-traffic sources and multicast-traffic receivers under a common network fabric element, in accordance with an illustrative embodiment.

FIG. 3 is a diagram illustrating an example network-aware consolidation, by orchestration, of multicast-traffic sources and multicast-traffic receivers under a common network fabric element, in accordance with an illustrative embodiment. As shown in FIG. 3, multicast-traffic receivers 202 (shown as "r0" 202a, "r1" 202b, "r2" 202c, and "r3" 202d) and corresponding multicast-traffic source 204 (shown as "s1" 204a) are provisioned, or located, across several leaf switches 110 (shown as "L0" 110a, "L1" 110b, and "LN" 110c). The multicast-traffic receivers 202 include physical devices (shown as "r5" 202d on device 112a_5) and virtual devices (e.g., 202a, 202b, 202c) provisioned on a first set of network devices (e.g., 112a_1, 112a_2, 112a_3). The multicast-traffic source 204 include a virtual device (e.g., 204a) provisioned on a set of network devices (e.g., 112b_1).

In this example, multicast-traffic source "s1" 202 is provisioned on network device 112b_1, which is operatively coupled to leaf switch "LN" 110c, while corresponding multicast-traffic receivers (e.g., 202a, 202b, 202c, and 202d) are operatively coupled to leaf switch "L0" 110a and "L1" 110b. When a multicast packet is transmitted from multicast-traffic source "s1" 204a to multicast-traffic receivers 202 (e.g., 202a-202d), may result in a packet replication at the leaf-switch 110c to spine switch "SN" 108b, followed by two packet replications at the spin switch "SN" 108b to leaf switches "L0" 110a and "L1" 110b, and followed by four corresponding replications at the leaf-switches 110a, 110b to the multicast-traffic receivers 202a, 202b, 202c, and 202d. By migrating, for example, multicast-traffic source "s1" 204a provisioned at a scattered device network 112b_1 located at leaf-switch "LN" 110c to another leaf-switch that includes one or more multicast-traffic receivers of the same multicast traffic (here, "s1" 204a shown to migrate to leaf-switch "L1" 110b as a provisioned multicast-traffic source "s1" 204b), the same (or subsequent) multicast packet transmitted from multicast-traffic source "s1" 204b to multicast-traffic receivers 202a-202d may result in one less packet replications (which is about 14 percent increase in transmission efficiency in this example). That is, by migrating multicast-traffic source "s1" 204a from network device 112b_1 to network device 112a_4, the spine-switch "S0" 108b now performs a single packet replication (rather than 2 packet replications) to leaf-switches "L0" 110a, which then performs three corresponding replications to the multicast-traffic receivers 202a, 202b, 200d, while leaf-switch "L1" 110b performs a packet replication to multicast-traffic receiver 202c.

Further consolidation of multicast-traffic receivers 202 (e.g., 202a-202d) and multicast-traffic source 204 to common leaf-switch (or common spine switch) would further improve transmission efficiency. For example, by consolidating all the multicast-traffic receivers (e.g., 202a-202d) and multicast-traffic source (e.g., 204b) under a single common leaf-switch (e.g., 110a) (e.g., by migrating "r2" 202c and "r4" 202e to network device 112a_1 and/or 112a_2) (and, e.g., by migrating "s1" 204a to network device network device 112a_1 and/or 112a_2 and/or another network device coupled to the leaf-switch 110a), the number of replications, in this example, is reduced to 4 (a 42% percent increase in transmission efficiency from 7 replications in the first example prior to consolidation).

Example Process

Figure 4:
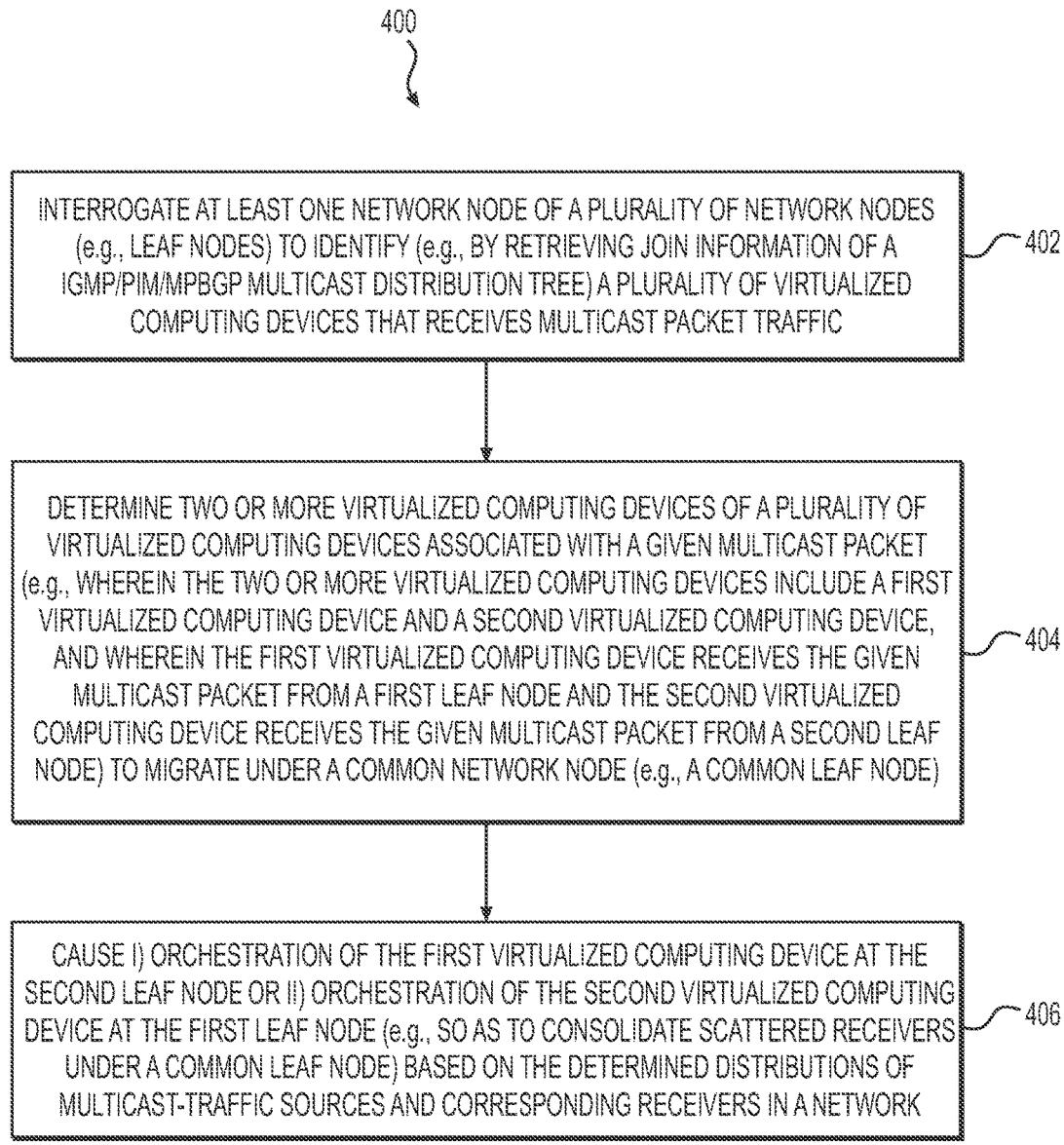
FIG. 4 is a flow diagram of a method of consolidating or migrating virtual machines or virtual network devices that receive multicast packet traffic, in accordance with an illustrative embodiment.

FIG. 4 is a flow diagram of a method 400 of consolidating or migrating virtual machines or virtual network devices that receive multicast packet traffic, in accordance with an illustrative embodiment.

The method 400 includes interrogating (step 402), via a controller (e.g., 102), network nodes (e.g., routers and switches) in a network, wherein the at least one network node maintains a list of identification or network addresses of virtualized and/or physical computing devices (e.g., multicast-traffic receivers 202) that receives a multicast packet traffic. That is, the virtualized and/or physical computing devices has membership in a group domain associated with a group network address.

In some embodiments, the interrogation comprises retrieving membership information of a multicast tree (e.g., Internet Group Management Protocol (IGMP) multicast distribution tree, Protocol Independent Multicast (PIM)/ Multiprotocol Extended Border Gateway Protocol (MP-BGP) distribution tree). In some embodiments, membership information includes JOIN information such as network address and/or routing/hop identifier.

Referring still to FIG. 4, the method 400 includes determining (step 404), via the controller 102, two or more virtualized computing devices (e.g., 202 or 204) of a plurality of virtualized computing devices associated with a given multicast packet to migrate under a common network node (e.g., a common leaf node).

Figure 5:
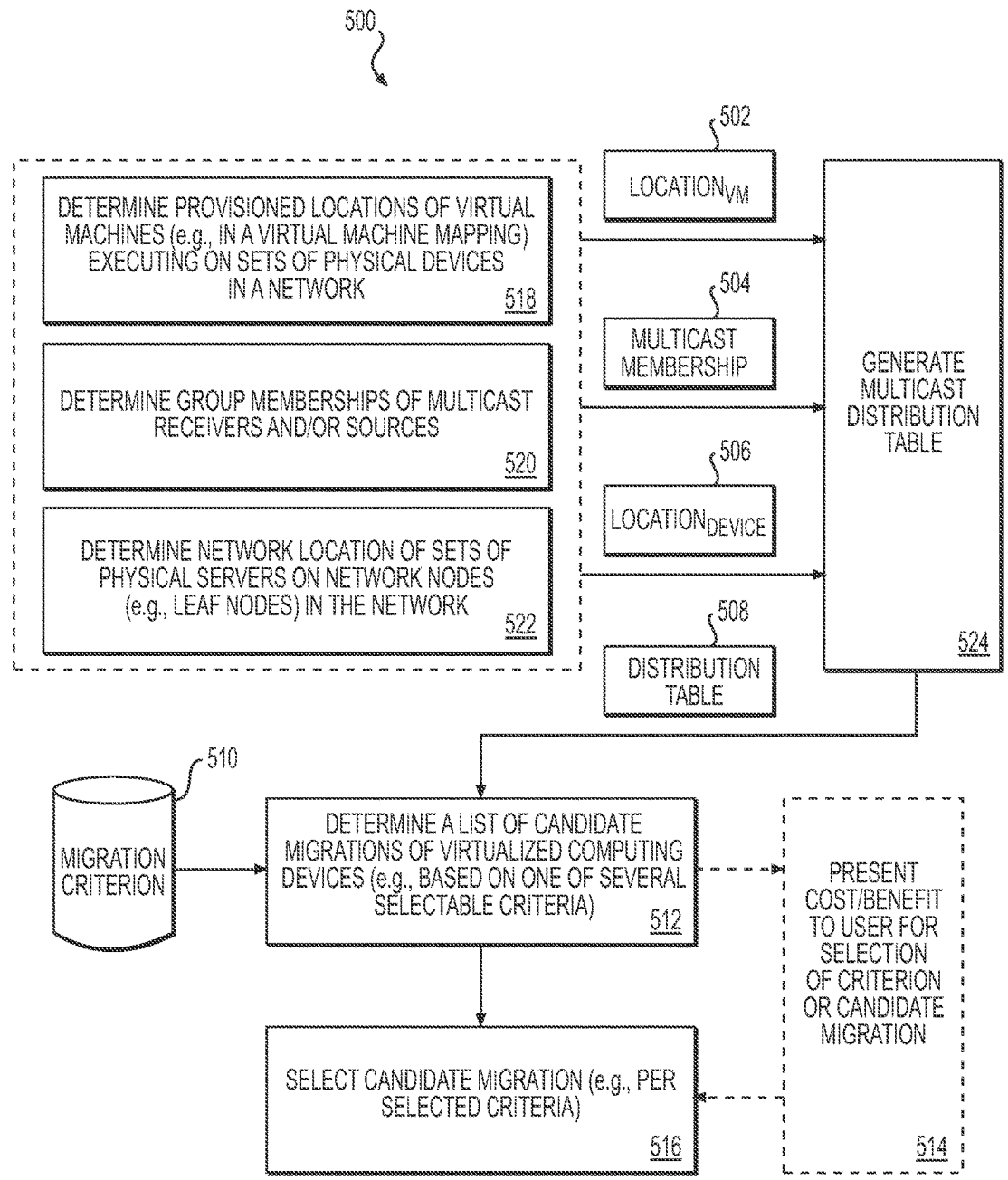
FIG. 5 is a flow diagram of an example method of determining virtualized computing devices to migrate under a common network node, as discussed in relation to FIG. 4, in accordance with an illustrative embodiment.

FIG. 5 is a flow diagram of an example method 500 of determining virtualized computing devices to migrate under a common network node, as discussed in relation to FIG. 4, in accordance with an illustrative embodiment.

As shown in FIG. 5, in some embodiments, the controller 102 uses location information of virtualized resources (e.g., shown as "Location$_{VM}$" 502), multicast group membership information of such virtualized resources (e.g., shown as "Multicast Membership" 504), and location information of physical devices associated with the virtualized resources (e.g., shown as "Location$_{Device}$" 506) to generate a multicast distribution table 508. The distribution table 508 are evaluated (e.g., via operation 512) in accordance with one or more migration criteria 510 to generate a list of candidate migration. The list of candidate migrations is presented (e.g., via operation 514) to the user, in some embodiments, for selection (e.g., via operation 516) of a migration action.

Example Generation of Multicast Distribution Table

As stated above, the controller 102 may use location information of virtualized resources (e.g., shown as "Location$_{VM}$" 502), multicast group membership information of such virtualized resources (e.g., shown as "Multicast Membership" 504), and location information of physical devices associated with the virtualized resources (e.g., shown as "Location$_{Device}$" 506) to generate a multicast distribution table 508. In some embodiments, the various information may be determined via, or retrieved through, processes executing on the controller 102.

Referring still to FIG. 5, the controller 102 may determine (operation 518) provisioned locations of virtualized and/or physical computing devices by retrieving provisioned table from other controllers and management systems. Table 1 is an example provisioned table of locations of virtualized resources on physical devices.

TABLE 1

| USC-Server | Virtual Machines |
|---|---|
| PS1 | r1, r5 |
| PS2 | s1, r6 |
| PS3 | r2, r7 |
| PS4 | r3, r4, r8, s2 |

As shown in Table 1, provisioned table of locations of virtualized resources on physical devices, in some embodiments, includes an identifier of a physical device (e.g., shown as "USC-Server" in Table 1 with servers "PS1", "PS2", "PS3", and "PS4") and corresponding virtual resources (e.g., shown as "Virtual Machines" in Table 1 with receivers "r1"-"r8" and sources "s1" and "s2") running on them.

In some embodiments, the controller 102 tracks multicast sources and listeners attached to each network node (e.g., leaf node) in a given network fabric. In some embodiments, tracking end-host movement includes discovering end hosts and propagating the end-host reachability information to the other switches (leaf switches) in the fabric. End-host detection can occur through Address Resolution Protocol (ARP), Neighbor Discovery Protocol (NDP), or VDP (Virtual Station Interface (VSI) Discovery and Configuration Protocol). For example, local end-host entries may be built via intercepted ARP, NDP, or VDP packets to populate a database.

Referring still to FIG. 5, the controller 102 may determine (e.g., via operation 520) multicast group membership information 504 of virtualized resources, e.g., by interrogating (e.g., IGMP, PIM, MPBGP control plane) network devices to determine a distribution of multicast sources and multicast receivers, as discussed in relation to FIG. 4.

Table 2 illustrates an example multicast membership table that includes retrieved membership information of one or more multicast trees.

TABLE 2

| Multicast Membership Group | Multicast-traffic Receivers | Multicast-traffic Source(s) |
|---|---|---|
| g1 | r1, r2, r3, r4, etc. | s1 |
| g2 | r5, r6, r7, r8, etc. | |

As shown in Table 2, the multicast membership table includes a group identifier (shown as "g1" and "g2", a set of multicast-traffic receiver identifiers (shown as receivers "r1"-"r8"), and one or more multicast-traffic source identifiers (shown as "s1" and "s2")). In some embodiments, the group identifier is associated with a multicast destination address, and each of the multicast-traffic receiver identifiers and multicast-traffic source identifiers are associated with a network address of the device (e.g., an IP address).

Multicast (as well as unicast) routing, in some embodiments, considers the destination address and that forwarding of traffic toward that address (and not the source address). In multicast forwarding, a source sends, in some embodiments, traffic to an arbitrary group of hosts that are represented by a multicast group address. A multicast router may determine upstream and downstream direction of the traffic and common downstream paths are identified for multiple downstream paths. PIM uses, in some embodiments, Reverse Path Forwarding (RPF) operations that use unicast routing information (e.g., unicast routing table) to create a distribution tree along a reverse path from the receivers toward the source, e.g., via Enhanced Interior Gateway Routing Protocol (EIGRP), Open Shortest Path First (OSPF), Border Gateway Protocol (BGP), and static routes. In some embodiments, PIM (e.g., PIM Dense mode) broadcasts multicast traffic to every corner of the network to identify active receivers, e.g., on each of the subnet in the network. In other embodiments, PIM (e.g., PIM Sparse mode) allows active receivers to request for delivery of multicast-traffic. IGMP uses IGMP control messages that are sent between the hosts and the routers to determine which switch ports are connected to interested receivers.

Other multicast protocol may be used to provide multicast distribution tree to identified scattered multicast-traffic receivers and/or sources. Examples of such multicast protocol includes, but not limited to Pragmatic General Multicast (PGM), Cisco Group Management Protocol, among others.

Referring still to FIG. 5, the controller 102 may determine (e.g., via operation 522) network-node locations of computing resources in a network to determine location information of physical devices associated with the virtualized resources 506. Table 3 shows an example network-node locations of computing resources in a network.

TABLE 3

| USC-Server | Leaf Node |
|---|---|
| PS1 | L1 |
| PS2 | L1 |
| PS3 | L2 |
| PS4 | L3 |

As shown in Table 3, the network-node locations may be referenced by leaf node identifier (shown in Table 3 as node "L1"-"L3").

Referring still to FIG. 5, the tracked information, e.g., of hosts, are combined (e.g., via operation 522), in some embodiments, with forwarding information of multicast distribution tree, e.g., from multicast protocols (e.g., IGMP, PIM, MPBGP) via control plane queries, to determine distributions (e.g., the distribution table 508) of multicast-traffic sources and corresponding receivers in a network. Table 4 illustrates an example multicast distribution table (e.g., 508), e.g., generated from the combination of information from Tables 1, 2, and 3.

TABLE 4

| Multicast Membership Group | Multicast-traffic Receivers | Multicast-traffic Sources | USC-Servers | Leaf Node |
|---|---|---|---|---|
| g1 | r1, r2, r3, r4 | s1 | PS1, PS3, PS4, PS4 | L1, L2, L3, L3 |
| g2 | r5, r6, r7, r8 | | PS1, PS2, PS3, PS4 | L1, L1, L2, L3 |

As shown in Table 4, the distribution table 508, in some embodiments, is indexed and/or referenced by a multicast group address associated with multicast source and receivers distribution in the fabric across (s, g) (that is, all sources and all multicast groups) and across all (*, g) (that is, all common shared tree). The distribution table 508, in some embodiments, includes a list of multicast-traffic receivers (e.g., virtual machines or devices), a list of multicast-traffic source (e.g., virtual machines or devices).

In some embodiments, the distribution 508 further includes a list of corresponding physical devices and/or a list of network nodes (e.g., leaf switch or spine switch) to which the multicast-traffic receivers and/or sources are connected.

Referring still to FIG. 5, in some embodiments, the list of candidate migrations are evaluated (e.g., via operation 512) based on available capacity for a physical server and confirming that the source is internal to the fabric (or not external to the fabric). These confirmation may be mandatory operations, in some embodiments, performed to generate, or filter, a given set of candidate migrations. Equation 1 provides an example function to determine if a move is allowable due to available capacity of potential destination physical servers.

$$f(x_i, y_{i-n}) = \begin{cases} \sum_{j=1}^{n} \text{capacity}(y_i) \leq \text{capacity}(x_i) \\ \text{Otherwise try } f(x_{i+1}, y_{1-n}) \end{cases} \quad \text{(Equation 1)}$$

In Equation 1, $x_i$ is a destination physical server (e.g., a hosting list of virtual nodes); $y_{1-n}$ is a list of virtual nodes to be moved; $f(x, y_{1-n})$ is a function to determine a move list of virtual nodes to a physical server; capacity( ) is a function that provides virtual- and physical-node requirement (e.g., CPU, RAM, disk, etc.), and $x_{i+1}$ is a next destination physical server to be tried.

An example criterion includes moving multicast traffic receivers closer to multicast traffic sources, or vice-versa. Another example criterion includes migrating similar scattered multicast-traffic receivers under a common leaf node.

In some embodiments, the list of candidate migration are ranked, and/or scored, based on a cost metric or a benefit metric. In some embodiments, network statistics of frequency or volume of multicast packets can be used to rank, or prioritize, scattered multicast-traffic receivers and/or sources to consolidate. Table 5 provides a list of example cost or benefit metric that may be used.

TABLE 5

Number of migration or re-orchestration to perform
for a given candidate migration
Expected change (e.g., increase or decrease) in the
available resources for a given candidate migration
Expected change (e.g., increase or decrease) in
network traffic (e.g., no. of hops) for a given
candidate migration
Number of leaf nodes associated with a multicast
membership for a given candidate migration
Common leaf node among sources and receivers Tables 6 and 7 each shows an example list of candidate migration generated by evaluating a distribution table (e.g., 508) in accordance with a criterion.

TABLE 6

| Scenario No. | Source | Destination |
|---|---|---|
| 1 | r2 (PS3) | PS1 |
|  | r3 (PS4) |  |
|  | r4 (PS4) |  |
| 2 | r1 (PS1) | PS3 |
|  | s1 (PS2) |  |
|  | r3 (PS4) |  |
|  | r4 (PS4) |  |
| e | r1 (PS1) | PS4 |
|  | s1 (PS2) |  |
|  | r2 (PS3) |  |

In Table 6, the list of candidate migration (e.g., for multicast group "g1" of Table 4) is generated based on the criterion of migrating multicast-traffic receivers to a common physical resource with the corresponding multicast-traffic source.

TABLE 7

| Scenario No. | Source | Destination |
|---|---|---|
| 1 | r7 (PS3) | PS1 |
|  | r8 (PS4) |  |
| 2 | r5 (PS1) | PS3 |
|  | r8 (PS4) |  |
| 3 | r5 (PS1) | PS4 |
|  | r6 (PS2) |  |
|  | r7 (PS3) |  |

In Table 7, the list of candidate migration (e.g., for multicast group "g2" of Table 4) is generated based on the criterion of migrating multicast-traffic receivers to a common leaf node with the corresponding multicast-traffic source.

Figure 6:
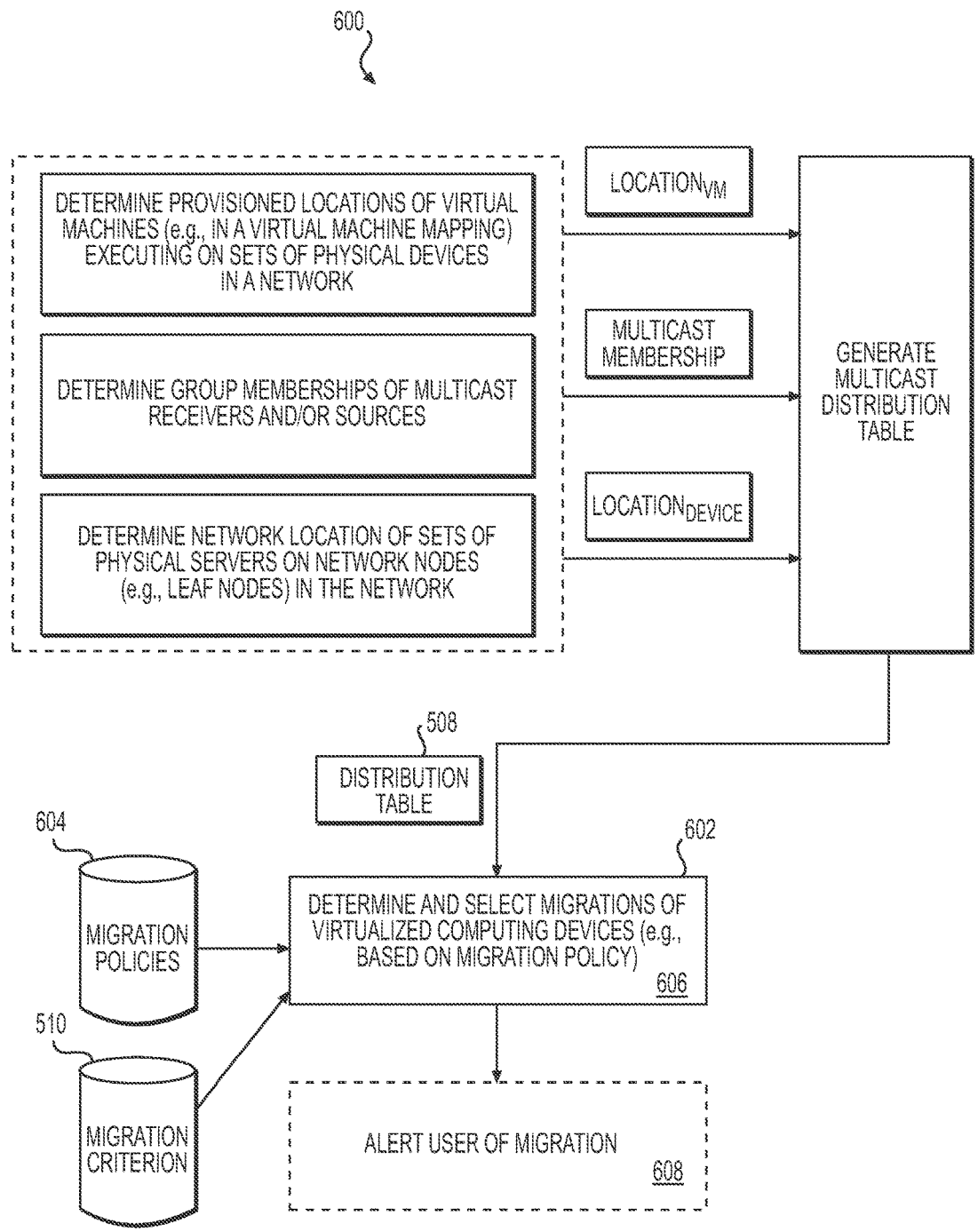
FIG. 6 is a flow diagram of another example method of determining virtualized computing devices to migrate under a common network node, as discussed in relation to FIG. 4, in accordance with another illustrative embodiment.

In some embodiments, the list of candidate migration is selected based on existing cloud management policies provided to the controller 102 by the user (e.g., a network administrator). FIG. 6 is a flow diagram of another example method 600 of determining virtualized computing devices to migrate under a common network node, as discussed in relation to FIG. 4, in accordance with another illustrative embodiment.

As shown in FIG. 6, a set of pre-defined migration criteria 510 are evaluated (e.g., via operation 606) to generate a set of list of candidate migrations, which are selected based on migration policies provide by a user (e.g., network administrator). In some embodiments, the migration criteria are part of a policy that is selected from a set of policies, or provided by command, by a user that is provided to, and executed upon by, the controller 102. In some embodiments, the distributions are analyzed, e.g., via solvers and/or optimization routines, to determine candidate scattered multicast-traffic receivers and/or sources for each identified multicast group.

In some embodiments, a highest ranked, or score of, candidate migration from the generated list is selected by the controller without further input from a user (e.g., a network administrator).

Example Migration

Figure 7:
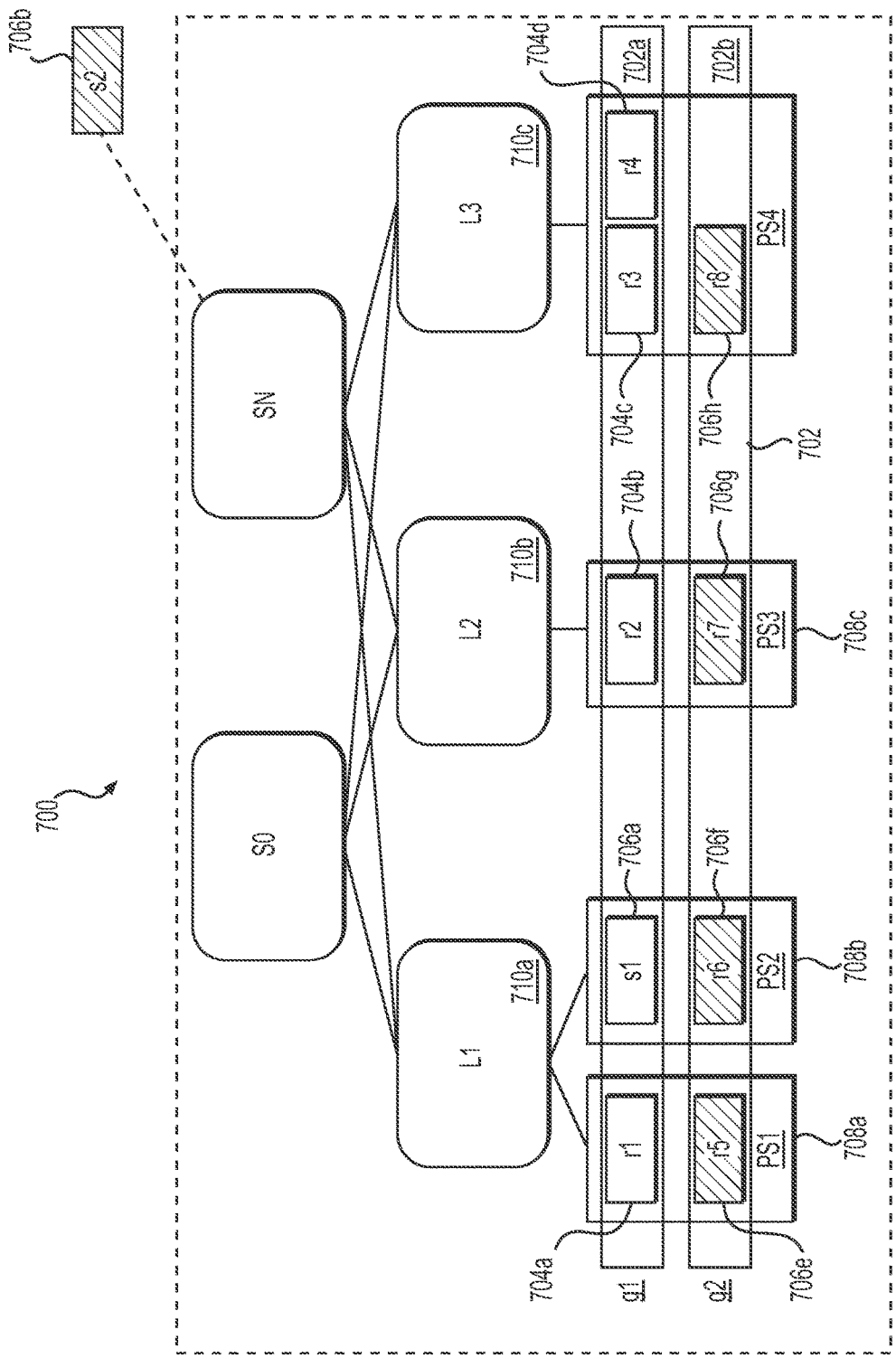
FIG. 7 is an example network topology to illustrate the method of consolidating or migrating virtual machines or virtual network devices that receive multicast packet traffic, as discussed in relation to FIGS. 4 and 5, in accordance with an illustrative embodiment.

FIG. 7 is an example network topology to illustrate the method of consolidating or migrating virtual machines or virtual network devices that receive multicast packet traffic, as discussed in relation to FIGS. 4 and 5, in accordance with an illustrative embodiment. As shown in FIG. 7, the multicast-traffic receivers and sources are arranged in accordance with a distribution as shown in, and discussed in relation to, Table 4.

As shown in FIG. 7, multicast group "g1" 702a includes multicast-traffic receivers "r1" 704a, "r2" 704b, "r3" 704c, "r4" 704d and multicast-traffic source "s1" 706a; and multicast group "g2" 702b includes multicast-traffic receivers "r5" 704e, "r6" 704f, "r7" 704g, "r8" 704h and multicast-traffic source "s2" 706b. The multicast-traffic receivers "r1" 704a-"r8" 704h are, in this example, virtual machines that are provisioned on server "PS1" 708a, "PS2" 708c, "PS3" 708c, "PS4" 708d. Servers "PS1" 708a and "PS2" 708b are operatively connected to leaf node "L1" 710a; server "PS3" 708c is operatively connected to leaf node "L1" 710b; and server "PS4" 708d is operatively connected to leaf node "L3". The multi-cast traffic source "s2" 706b is shown located outside the fabric that is external to the network (e.g., in a different data center).

Figure 8A:
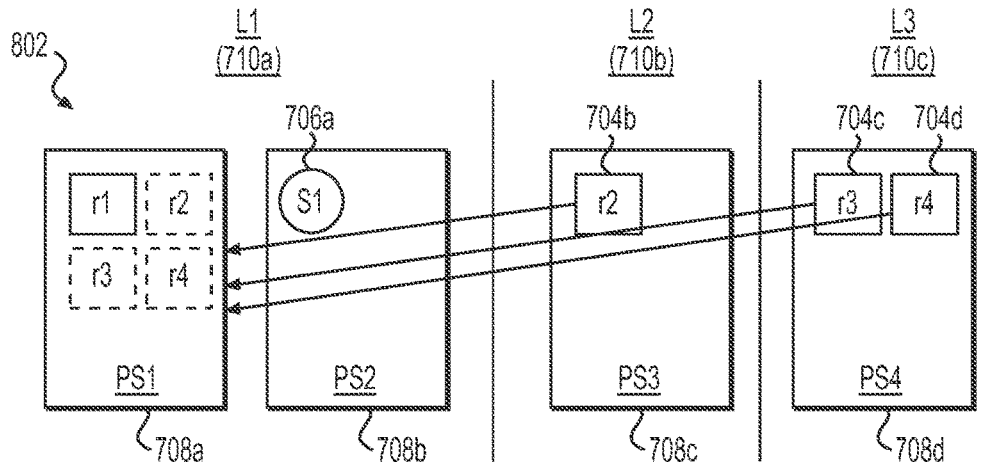
FIGS. 8A, 8B, and 8C, is a diagram illustrating example migrations of network resources in the example network topology of FIG. 7 per a list of candidate migrations shown in Table 6, in accordance with an illustrative embodiment.
Figure 8B:
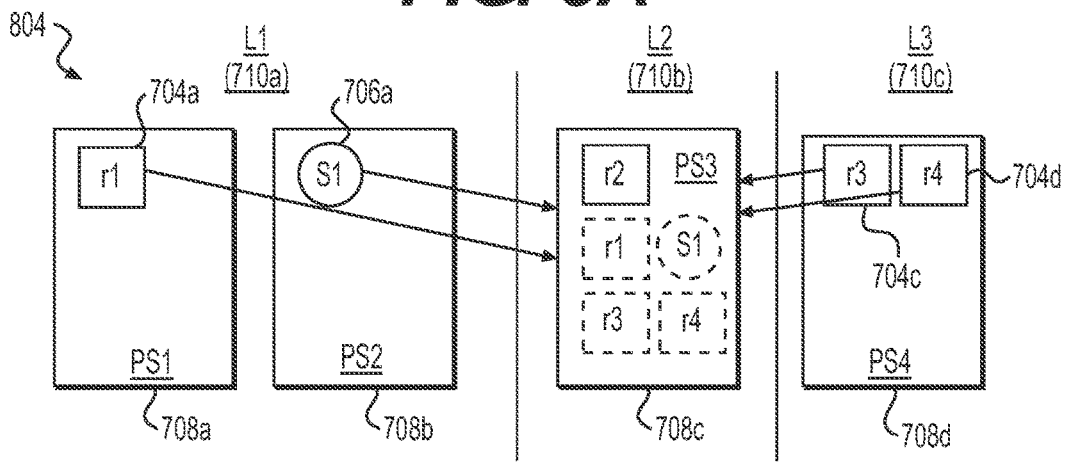
Figure 8C:
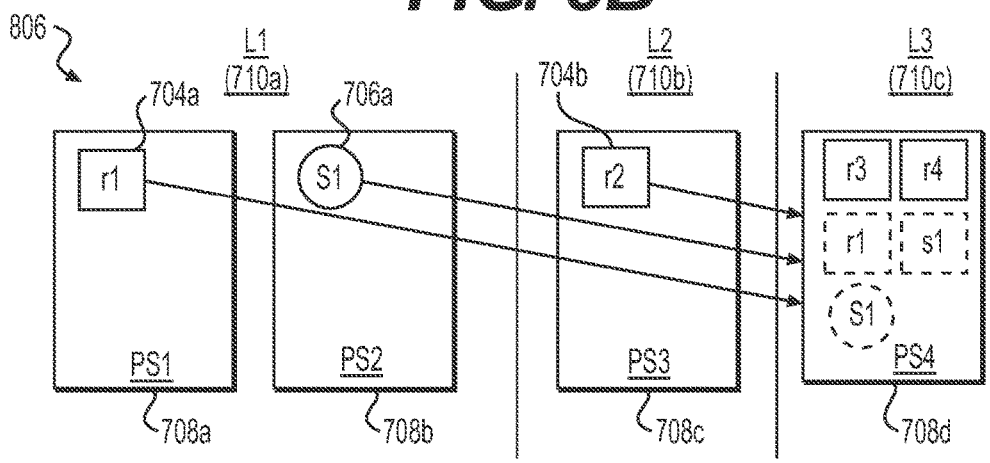

FIG. 8, comprising FIGS. 8A, 8B, and 8C, is a diagram illustrating example migrations of network resources (e.g., for multicast group "g1" 702a) in the example network topology of FIG. 7 per a list of candidate migrations shown in Table 6, in accordance with an illustrative embodiment.

In FIG. 8A (e.g., in a first scenario), multicast-traffic receiver "r2" 704b (provisioned on server "PS3" 708c located at leaf node "L2" 710b) and multicast-traffic receivers "r3" 704c and "r4" 704d (provisioned on server "PS4" 708d located at leaf node "L3" 710c) are consolidated to server "PS1" 708a located at leaf node 710a, which is common with the multicast-traffic source "s1" 706a (provisioned on server "PS2" 708b). In FIG. 8B (e.g., in a second scenario), multicast-traffic receiver "r1" 704a and multicast-traffic source "s1" 706a (provisioned on servers "PS1" 708a and "PS2" 708b, respectively, located at leaf node "L1" 710a) and multicast-traffic receivers "r3" 704c and "r4" 704d (provisioned on server "PS4" 708d located at leaf node "L3" 710c) are consolidated to server "PS3" 708c located at leaf node 710b. In FIG. 8C (e.g., in a third scenario), multicast-traffic receiver "r1" 704a and multicast-traffic source "s1" 706a (provisioned on servers "PS1" 708a and "PS2" 708b, respectively, located at leaf node "L1" 710a) and multicast-traffic receivers "r2" 704b (provisioned on server "PS43" 708c located at leaf node "L2" 710b) are consolidated to server "PS4" 708d located at leaf node 710c.

As shown, FIG. 8A (corresponding to the first scenario of Table 6) is shown to produce a greater expected reduction in network traffic (e.g., number of hops) for a given multicast traffic. FIG. 8A also shows a least, or comparable, number (e.g., 3) of migration or re-orchestration as compared to scenarios in FIGS. 8B and 8C.

Various other criterion or criteria may be applied. In addition, the list of candidate migrations may be selected based on various policies.

Figure 9A:
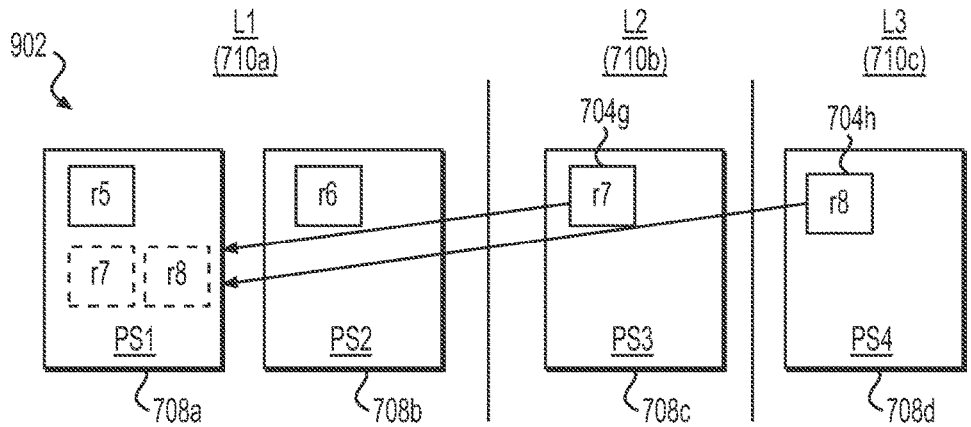
FIGS. 9A, 9B, and 9C, is a diagram illustrating example migrations of network resources in the example network topology of FIG. 7 per a list of candidate migrations shown in Table 7, in accordance with an illustrative embodiment.
Figure 9B:
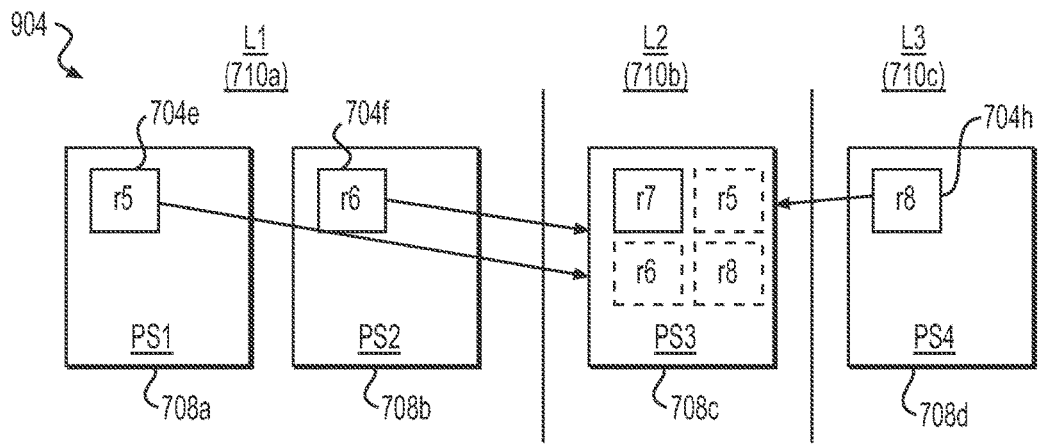
Figure 9C:
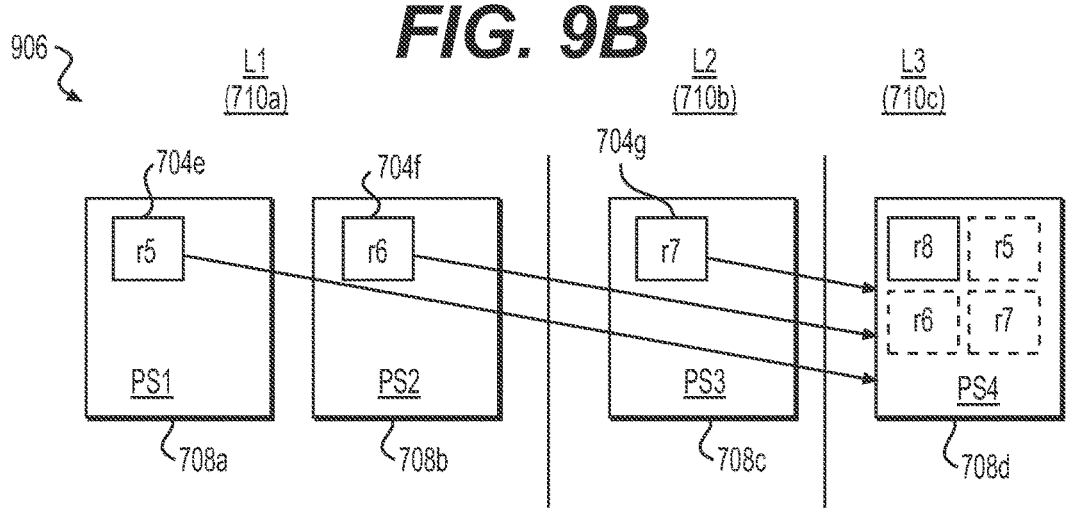

FIG. 9, comprising FIGS. 9A, 9B, and 9C, is a diagram illustrating example migrations of network resources (e.g., for multicast group "g2" 702b) in the example network topology of FIG. 7 per a list of candidate migrations shown in Table 7, in accordance with an illustrative embodiment. In FIG. 9A (e.g., in a first scenario), multicast-traffic receivers "r7" 704g and "r8" 704h (provisioned on servers "PS3" 708c and "PS4" 708d, each located at leaf node "L3" 710c) are consolidated to server "PS1" 708a located at leaf node 710a. In FIG. 9B (e.g., in a second scenario), multicast-traffic receivers "r5" 704e and "r6" 704f (provisioned on servers "PS1" 708a and "PS2" 708b, respectively, located at leaf node "L1" 710a) and multicast-traffic receivers "r8" 704h (provisioned on server "PS4" 708d located at leaf node "L3" 710c) are consolidated to server "PS3" 708c located at leaf node 710b. In FIG. 9C (e.g., in a third scenario), multicast-traffic receiver "r5" 704e, "r6" 704f, "r7" 704g (provisioned on servers "PS1" 708a, "PS2" 708b, "PS3" 706c, respectively, located at leaf nodes "L1" 710a, "L2" 710b) are consolidated to server "PS4" 708d located at leaf node 710c.

As shown, FIG. 9A (corresponding to the first scenario of Table 7) is shown to have a least number of migration or re-orchestration, as compared to scenarios in FIGS. 9B and 9C, while eliminating multicast traffic to leaf node "L2" 710b and "L3" 710c.

Various other criterion or criteria may be applied. In addition, the list if candidate migrations may be selected based on various policies. In some cases, a virtual machine may have affinity towards a specific physical server. In some embodiments, the move-algorithm takes this affinity into account (e.g., as a filter or threshold determination).

In some embodiments, the controller 102 may consider virtual compute swap if it provides improved network-fabric performance.

In some embodiments, when workload of a virtual machine is known during its provisioning (e.g., the list of group used by the new virtual node), the controller 102 can use the workload when provisioning the new VM to provide improved network-fabric performance (e.g., increase multicast efficiency in the network fabric).

In some embodiments, e.g., when a same VM is a receiver and source for multiple multicast groups, the determination of a list of candidate migration includes options that only satisfy a given criterion or policy for each of the multiple multicast groups. In other embodiments, solvers and/or optimization routines are used to determine a migration option that, e.g., minimize or maximize certain parameters (e.g., criteria listed in Table 5).

Referring back to FIG. 4, the method 400 includes causing, by the controller 102, orchestration of migration of the virtualized computing device so as to consolidate scattered receivers and/or sources (e.g., 202, 204) under a common network node. In some embodiments, the controller 102 orchestrates migration of the first virtualized computing device at the second network node or migration of the second virtualized computing device at the first network node, e.g., under a common leaf node or a common spline node.

Figure 10:
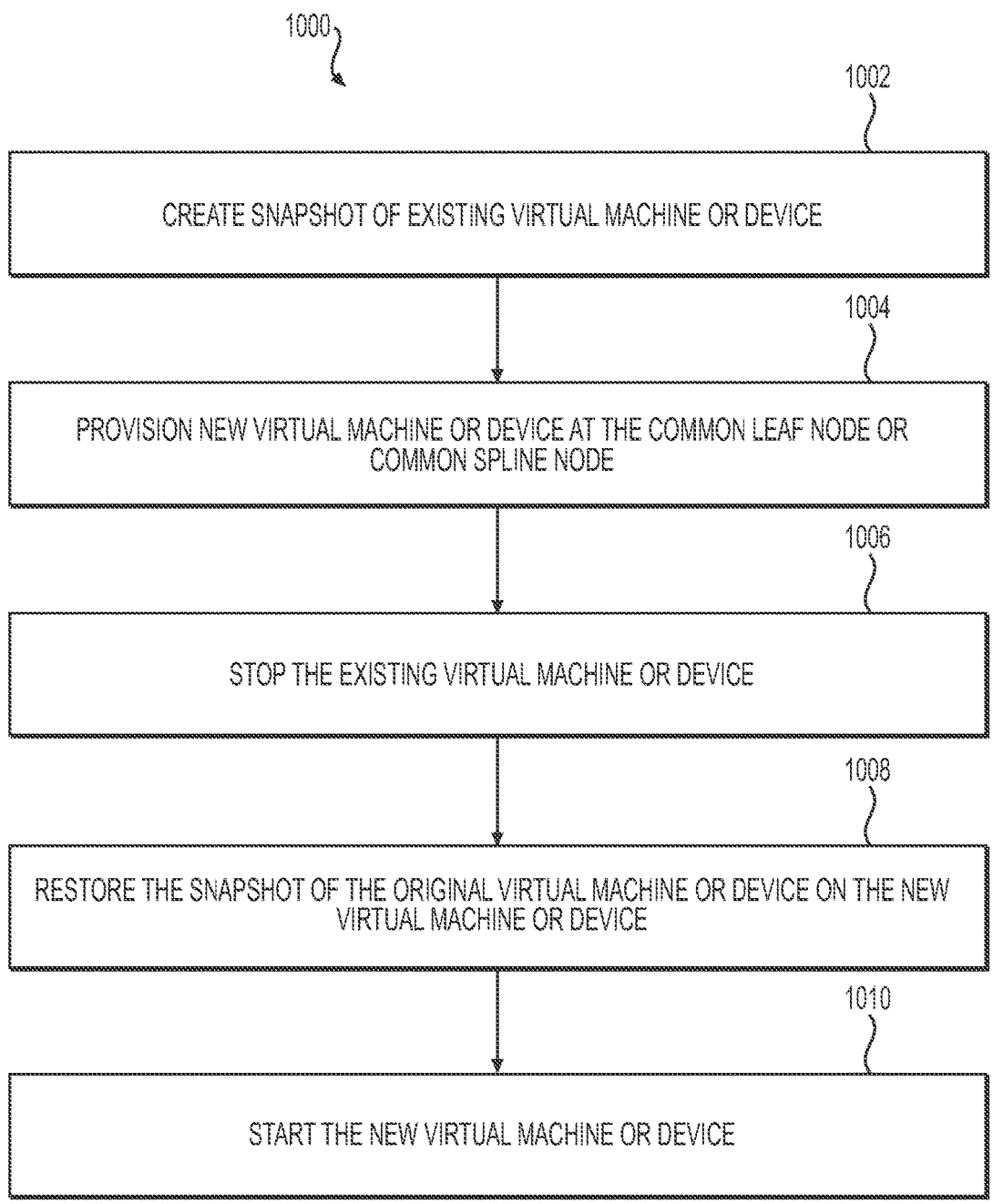
FIG. 10 is a flow chart illustrating an example method of migration of a virtualized computing device so as to consolidate scattered receivers and/or sources under a common network node, in accordance with an illustrative embodiment.

FIG. 10 is a flow chart illustrating an example method 1000 of migration of a virtualized computing device so as to consolidate scattered receivers and/or sources (e.g., 202, 204) under a common network node, in accordance with an illustrative embodiment.

As shown in FIG. 10 the method 1100 of migrating a scattered multicast-traffic receiver and/or source includes taking (step 1002) a snapshot of the existing virtual machine or device (i.e., the original virtual machine or device), provisioning (step 1004) a new virtual machine or device at the common leaf node or common spline node, stopping (step 1006) the original virtual machine or device, restoring (step 1008) the snapshot of the original virtual machine or device on the new virtual machine or device, and starting (step 1010) the new virtual machine or device.

Other methods of migration of a virtualized computing device so as to consolidate scattered receivers and/or source may be performed. In some embodiments, the method may include sending a command to the controller 102 (e.g., a VM controller or a cloud controller (e.g., data center controller)). The command may include the VM address or identifier to be migrated and a new destination device (which may be referenced by a network address or identifier). In some embodiments, the controller 102 may direct a virtualization controller (e.g., ESX, OpenStack, or similar orchestration software/controller and/or services) to perform the migration with a command that includes an identification or identifier of the scattered multicast-traffic receiver and/or sources to be migrated. The virtualization controller, in some embodiments, creates logical pools of system resources to facilitate sharing of same physical resources by virtual machines.

In some embodiments, the controller 102 determines, and send an identifier associated with, a physical device to provision the new virtual machine or device. In other embodiments, the controller 102 determines a leaf node or a spline node to which a physical device associated therewith can be determined to provision the new virtual machine or device.

In some embodiments, the controller 102 is implemented, e.g., as a module, within a cloud management or orchestration management system, e.g., a Linux controller, an OpenStack controller, an ESX controller, and similar controllers. In other embodiments, the controller 102 is a switch or router.

Although example embodiments of the present disclosure have been described with reference to specific example embodiments, it will be evident that various modifications and changes may be made to these embodiments without departing from the broader spirit and scope of the disclosure. For example, although the present disclosure has been described with reference to particular communication exchanges involving certain network access and protocols, other network accesses and protocols may be applicable.

Accordingly, the specification and drawings are to be regarded in an illustrative rather than a restrictive sense. For example, the embodiments have been shown and described herein with relation to specific protocols, architecture, communication processes, and terminology. However, the embodiments in their broader sense are not as limited, and may, in fact, be used with other suitable protocols, architecture, and processes using functionally similar terms.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In example implementations, at least some portions of the activities may be implemented in software executing on controllers, network nodes, and/or multicast-traffic receivers and sources. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the network elements described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements can store data used for the operations described herein. This includes the memory being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

What is claimed is:

1. A system comprising:
   a processor; and
   a memory having instructions stored thereon, wherein execution of the instructions, cause the processor to:
   interrogate at least one network node of a plurality of network nodes each corresponding to a leaf node in a network to identify a plurality of virtualized computing devices that receives a multicast packet traffic from the at least one network node; and
   identify two or more virtualized computing devices of the plurality of virtualized computing devices associated with a given multicast packet to migrate under a common leaf node, wherein the two or more virtualized computing devices include a first virtualized computing device and a second virtualized computing device, and wherein the first virtualized computing device receives the given multicast packet from a first leaf node and the second virtualized computing device receives the given multicast packet from a second leaf node;
   cause i) orchestration of the first virtualized computing device at the second leaf node or ii) orchestration of the second virtualized computing device at the first leaf node;
   interrogate a second network node of the plurality of network nodes to identify a plurality of virtualized computing devices that receives a second multicast packet traffic from the second network node;
   identify two or more second virtualized computing devices of the plurality of virtualized computing devices associated with the second multicast packet to migrate under a common leaf node, including a third virtualized computing device and a fourth virtualized computing device; and
   cause orchestration of at least one of the two or more second virtualized computing devices at a border router or a network node proximal to the border router.

2. The system of claim 1, wherein the instructions that cause the orchestration of the first virtualized computing device at the second leaf node comprise:
   one or more instructions that when executed by the processor cause the processor to:
   transmit a first command to instantiate the first virtualized computing device at the second leaf node; and
   transmit a second command to remove the first virtualized computing device at the first leaf node.

3. The system of claim 1, wherein the instructions that cause the orchestration of the second virtualized computing device at the first leaf node comprises:
   one or more instructions that when executed by the processor cause the processor to:
   transmit a first command to instantiate the second virtualized computing device at the first leaf node; and
   transmit a second command to remove the second virtualized computing device at the second leaf node.

4. The system of claim 1, wherein the instructions, when executed by the processor, cause the processor to:
   interrogate control plane of a plurality of multicast packets to determine a distribution data of multicast sources and multicast receivers of the plurality of multicast packets, wherein i) orchestration of the first virtualized computing device at the second leaf node or ii) orchestration of the second virtualized computing device at the first leaf node is performed based on the determined distribution data.

5. The system of claim 1, wherein the system is implemented in a standalone controller in the network.

6. The system of claim 1, wherein the system is implemented in a switch.

7. The system of claim 1, wherein execution of the instructions, cause the processor to:
retrieve a network identifier associated with each of the or more virtualized computing devices; and
determine a corresponding name of each given virtualized computing device, wherein the name of each given virtualized computing device is used to instantiate the given virtualized computing device at a new leaf node.

8. The system of claim 1, wherein execution of the instructions, cause the processor to:
determine, for a given multicast packet, a number of hops between a source and each receiver of a plurality of receivers of the given multicast packet; and
determine a leaf node that has a minimum number of aggregated hops between the source and each receiver if the receivers are relocated to the leaf node.

9. The system of claim 1, wherein the instructions are editable as policies executing on the system.

10. A system comprising:
a processor; and
a memory having instructions stored thereon, wherein execution of the instructions, cause the processor to:
interrogate at least one network node of a plurality of network nodes each corresponding to a leaf node in a network to identify a plurality of virtualized computing devices that receives the multicast packet traffic from the at least one network node;
identifying i) a first virtualized computing device of the plurality of virtualized computing devices as a source of the given multicast packet and i) two or more virtualized computing devices of the plurality of virtualized computing devices as a receiver of the given multicast packet, wherein the first virtualized computing device transmits the given multicast packet to a first leaf node and the second virtualized computing device receives the given multicast packet from a second leaf node;
cause orchestration of the first virtualized computing device at the second leaf node;
interrogate a second network node of the plurality of network nodes to identify a plurality of virtualized computing devices that receives a second multicast packet traffic from the second network node;
identify two or more second virtualized computing devices of the plurality of virtualized computing devices associated with the second multicast packet to migrate under a common leaf node, wherein the second multicast packet enters the network at a border router or switch; and
cause orchestration of at least one of the two or more second virtualized computing devices at the border router or a network node proximal to the border router.

11. The system of claim 10, wherein the instructions that cause the orchestration of the first virtualized computing device at the second leaf node comprise:
one or more instructions that when executed by the processor cause the processor to:
transmit a first command to instantiate the first virtualized computing device at the second leaf node; and
transmit a second command to remove the first virtualized computing device at the first leaf node.

12. The system of claim 10, wherein the instructions that cause the orchestration of the second virtualized computing device at the first leaf node comprises:
one or more instructions that when executed by the processor cause the processor to:
transmit a first command to instantiate the second virtualized computing device at the first leaf node; and
transmit a second command to remove the second virtualized computing device at the second leaf node.

13. The system of claim 10, wherein the instructions, when executed by the processor, cause the processor to:
interrogate control plane of a plurality of multicast packets to determine a distribution of multicast sources and multicast receivers of the plurality of multicast packets, wherein i) orchestration of the first virtualized computing device at the second leaf node or ii) orchestration of the second virtualized computing device at the first leaf node is performed based on the determined distribution.

14. The system of claim 10, wherein execution of the instructions, cause the processor to:
retrieve a network identifier associated with each of the or more virtualized computing devices; and
determine a corresponding name of each given virtualized computing device, wherein the name of each given virtualized computing device is used to instantiate the given virtualized computing device at a new leaf node.

15. The system of claim 10, wherein execution of the instructions, cause the processor to:
determine, for a given multicast packet, a number of hops between a source and each receiver of a plurality of receivers of the given multicast packet; and
determine a leaf node that has a minimum number of aggregated hops between the source and each receiver if the receivers are relocated to the leaf node.

16. The system of claim 1, wherein the instructions are editable as policies executing on the system.

17. A method comprising:
determining, by a processor, for a multicast group, a source virtual machine of the multicast group and a plurality of receiver virtual machines of the multicast group;
in response to determining one or more of the plurality of receiver virtual machines of the multicast group being attached to a first number of different leaf nodes, including a first leaf node and a second leaf node, causing, by the processor, consolidation of the plurality of receiver virtual machines by instantiating one or more of the receiver virtual machines at one or more common leaf nodes, wherein the one or more common leaf nodes has a second number of different leaf nodes that is less than the first number; and
in response to identifying a second two or more virtualized computing devices of the plurality of virtualized computing devices being associated with a second multicast packet, wherein the second multicast packet is sourced from a computing device external to the network and wherein the second multicast packet enters the network at a border router or switch, cause orchestration of the second two or more virtualized computing devices at the border router or a network node proximal to the border router.

18. The method of claim 17, wherein the consolidation reduces a number of forwarding actions for a given multicast traffic to be multicast replicated to the multicast group.

19. The method of claim 17, wherein the multicast group is determined based on an interrogation of a protocol control plane, wherein the protocol is selected from the group consisting of Internet Group Management Protocol (IGMP), protocol independent multicast (PIM), and Multiprotocol-BGP (MPBGP).

20. The system of claim 1, wherein the instructions stored thereon further include instruction that when executed by the processor, further cause the processor to:
    generate a multicast distribution table, wherein the distribution table are evaluated in accordance with one or more migration criteria to generate a list of candidate migration.

\* \* \* \* \*